United States Patent [19]

Yang

[11] Patent Number: 4,647,139

[45] Date of Patent: Mar. 3, 1987

[54] EXTENTION CORD CHARGING DEVICE FOR CONNECTING TOOLS AND APPLIANCES TO PLUG RECEPTACLE IN VEHICLE

[76] Inventor: Tai-Her Yang, 5-1 Taipin St., Si-Hu Town, Dzan-Hwa, Taiwan

[21] Appl. No.: 760,773

[22] Filed: Jul. 31, 1985

[51] Int. Cl.$^4$ ............................................... H01R 3/00
[52] U.S. Cl. .................................. 339/154 A; 339/28; 339/29 B; 339/119 C
[58] Field of Search ................. 339/119 C, 147 C, 10, 339/28, 29 B, 29 R, 159 A; 242/96

[56] References Cited

U.S. PATENT DOCUMENTS 4,261,634 4/1981 Robinson ..................... 339/154 A X
4,353,613 10/1982 Carlow ............................ 339/119 C Primary Examiner—Eugene F. Desmond
Attorney, Agent, or Firm—Leonard Bloom

[57] ABSTRACT

An extension cord charging device is adapted for "jump starting" a car with a discharged battery and, alternately, providing a convenient extension cord and receptacle for powering an electrical appliance (such as a light) plugged into the device. The housing for the device is formed by a pair of complementary mating halves molded from a suitable plastic material, and the cord (or cable) may be wound around respective side portions of the housing for storage purposes.

1 Claim, 6 Drawing Figures

EXTENTION CORD CHARGING DEVICE FOR CONNECTING TOOLS AND APPLIANCES TO PLUG RECEPTACLE IN VEHICLE

BACKGROUND OF THE INVENTION

This invention is an improvement to a wire for car use, and more particularly, to an improvement in the use of a car battery for powering various tools or appliances.

Besides the conventional battery cables, the prior art has disclosed a "charging wire" for car use. This device is a wire with plugs at both ends and a control box connected therebetween. The control box has a switch, a protective breaker, and an indicating LED. The purpose is to salvage or "jump start" another car (having a discharged battery) by an extension line. The deficiency of this conventional charging wire is as follows:

1. It is very difficult to locate the plug receiver of the car during the night. This requires the use of a flashlight.

2. There are no connecting wires for use of an electric jack, maintenance light, nut driver, refrigerator or coffee maker for field use, which often are needed with a car. These connecting wires are duplicates of the charging wire, are easy to misuse, and are economically unjustified.

SUMMARY OF THE INVENTION

The object of the present application is to correct the above-mentioned deficiencies. This is made possible by an auxiliary plug receiver and an inserted illuminating light to enlarge the function of the charging wire. A rewind structure is also equipped.

DETAILED DESCRIPTION OF THE INVENTION

Car batteries are usually discharged or below the charging level due to electricity failure, circuit breaking, defective voltage regulator or battery, repeated startings or leakage. In such case, the car will fail to start and manual pushing is required. The use of conventional battery cables or a conventional charging wire (as previously discussed) has certain defects.

This invention uses an auxiliary output plug socket near the load end of the control box for supplying electrical tools and further providing an illuminating lamp or other appliances.

Figure 1:
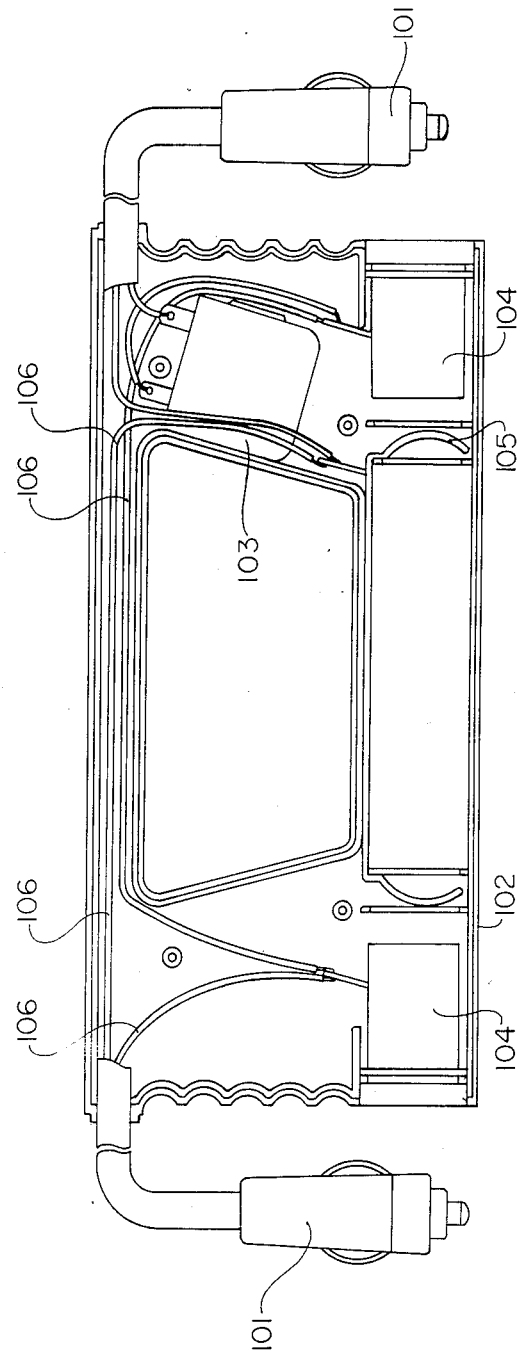
FIG. 1 is a longitudinal section of a car charging wire, constituting an extension cord device and incorporating the structure of the present invention.

With reference to FIG. 1, there is illustrated two inter-isolated electrode sets or plugs 102 to be plugged into the source socket (or cigarette lighter receptacle) of the car connecting the positive and the negative of the source socket. The housing for the device is made with plastic forming a desirable shape with the sockets 104. A recess in the housing forms a hand grip or handle.

Figure 2:
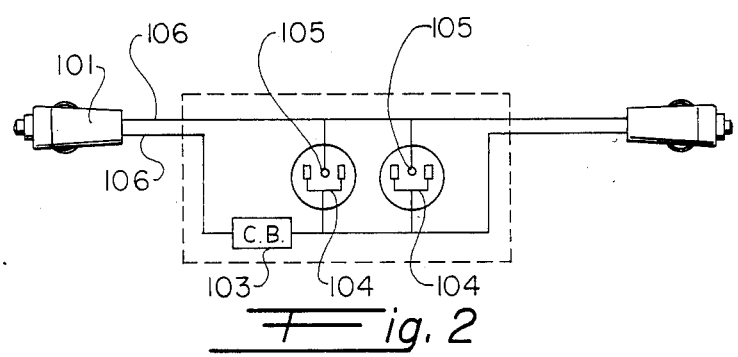
FIG. 2 is a schematic wiring diagram of the extension cord device shown in FIG. 1.

The housing 102 or cover is made with plastic or metal. Element 103 is a breaker for protection of overload output. Elements 104 are the output auxiliary sockets for supply to electrical tools, working lamp, or electric stove used for the car. Element 106 is a guide wire for transmission of the source energy, the circuit of which is shown in FIG. 2. The plug is used for plugging into an output socket of a serviceable car (generally the cigarette lighter socket or receptacle) or output end of the charger.

The current source is passed through the wire or line (106) to the breaker (103) through series and parallel to an output side socket; another wire or line is directly connected with the auxiliary output socket electrode (105) and output side socket.

Figure 3:
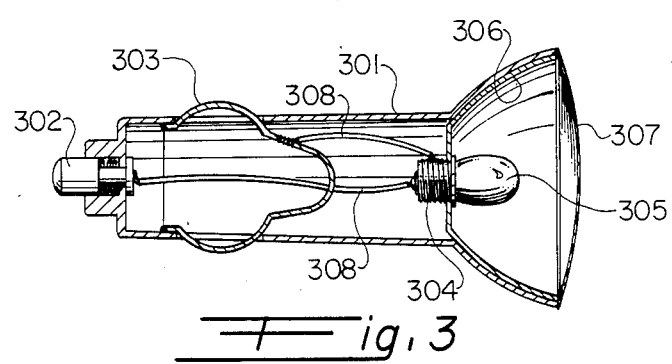
FIG. 3 is a longitudinal section of a flashlight or other illuminating equipment useful with the present invention.

FIG. 3 illustrates a further improved design of the structure of FIG. 1, characterized as a plug-in illuminating lamp for providing a light source for working in night. It is featured with a plug for receipt into and coupling with the auxiliary socket as a whole structure. The cylindrically-shaped cover (301) has an electrode (302) on top and a surrounding electrode (303), a lamp (304) on the other end with a lamp shade (305) and reflector (306) and reflecting glass (307) connected by line (308); a switch may be added if necessary for light control.

Figures 4A, 4B:
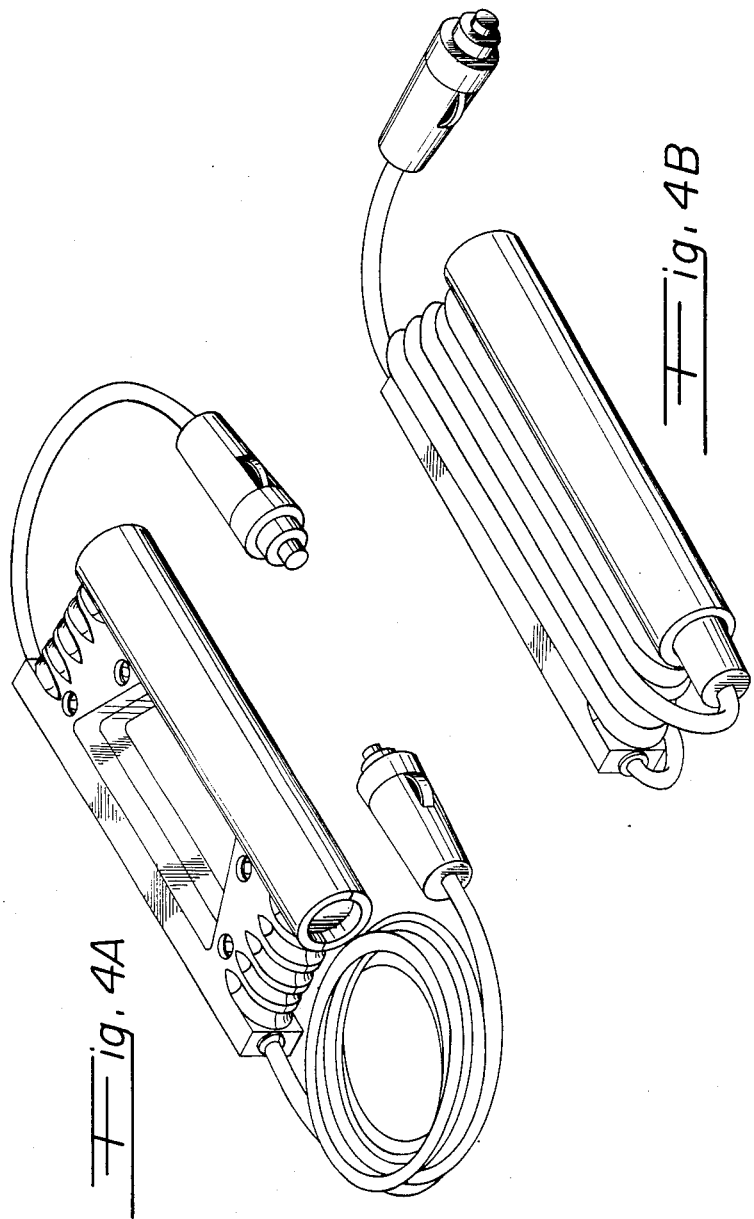
FIG. 4A is an isometric view of the device of the present invention with its extension cord or cable.
FIG. 4B is a further isometric view of the device of the present invention, corresponding substantially to FIG. 4A, but showing the extension cord wound about the device for storage purposes.

FIGS. 4A and 4B shows the manner in which the cord or cables may be wound about the housing for storage purposes.

Figure 5:
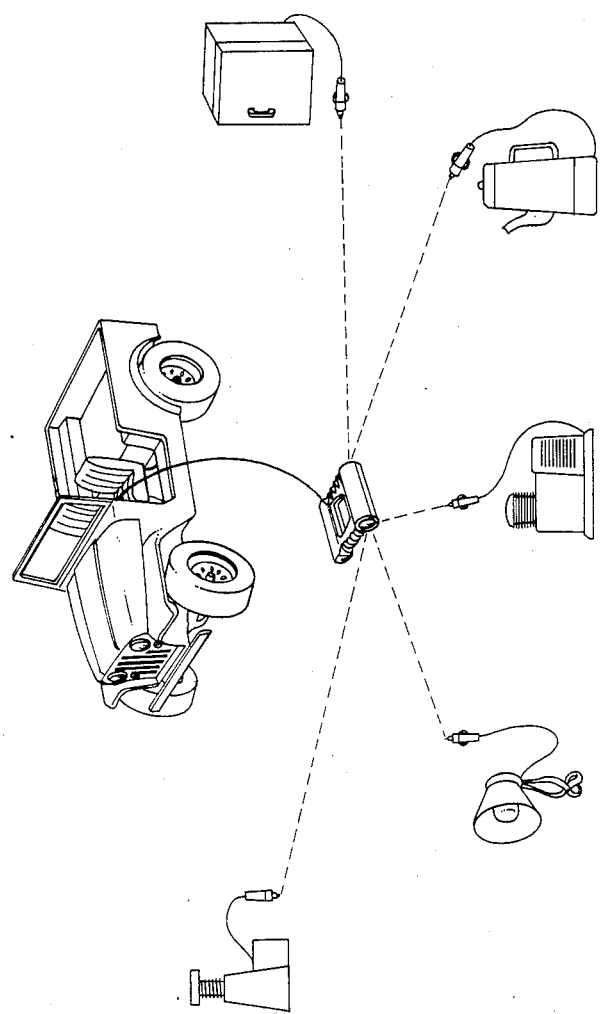
FIG. 5 schematically illustrates the utility of the present invention in powering various tools or appliances remote from the vehicle.

FIG. 5 schematically illustrates the application of the present disclosure for electrically powering various electrical devices from a vehicle.

From the above, the advantageous points of the design are:

1. In inspection and repairing of the car, the illuminating lamp will provide lighting; and an auxiliary socket will provide a power source for the supply of energy to electrical tools, lighting purposes, or camping use.

2. In salvage of other cars at night, the illuminating lamp will serve the lighting and locating of socket of a failed or disabled car.

A conventional charging wire can be used only for the transmission of energy. It is very inconvenient for wire rewinding and storage. This design is an improvement of the conventional one for better effects and it is indeed more practical.

I claim:

1. An extension cord device for utilizing the battery in a vehicle for energizing at least one electrical device located externally of the vehicle, wherein the battery is connected to a plug receptacle within the vehicle, comprising a molded plastic housing including a pair of mating halves joined together along a longitudinal midplane, the housing having a central recess formed therein to thereby define a hand grip, the housing further having a substantially tubular portion extending along a side of the housing substantially adjacent to the recess in the housing, the tubular portion having at least one end portion having a socket formed therein, the socket being adapted to receive a compatible plug on the electrical device, cable means carried by the housing and extending therefrom, the cable means carrying a plug for removable connection to the plug receptacle in the vehicle, means within the housing for connecting the cable means to the socket on the housing, the housing having respective side portions adjacent to the recess in the housing, and the side portions having means thereon for wrapping the cable means around the housing during storage of the extension, wherein the cable means allows the device to be used substantially remote from the vehicle.

* * * * *